Jan. 7, 1930.  C. M. TUTTLE ET AL  1,742,943
AUTOMATIC CONTROL FOR PHOTOGRAPHIC PRINTING EXPOSURES
Filed Sept. 26, 1927
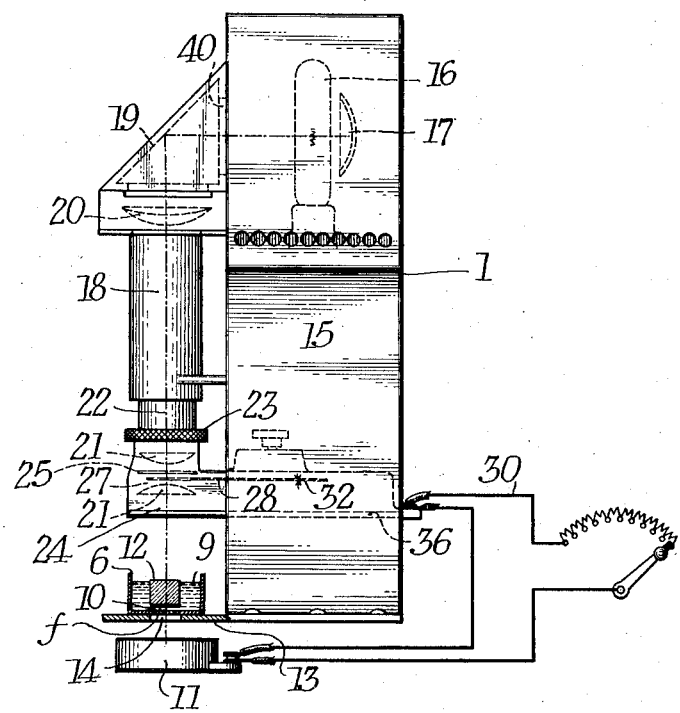
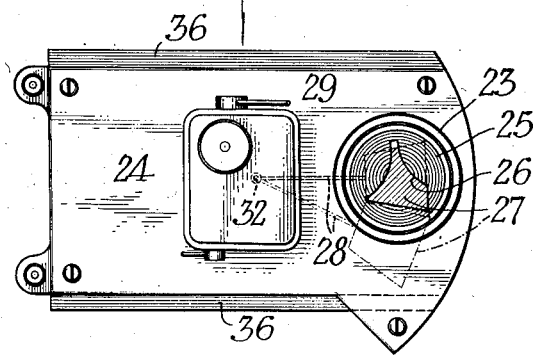
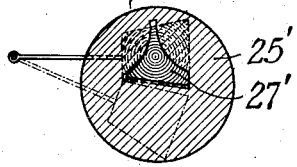
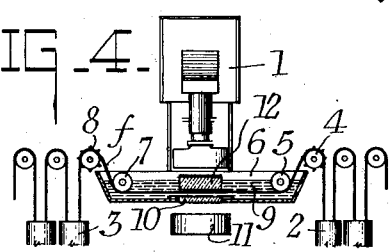
Clifton M. Tuttle & Herbert E. White, Inventors
By R. L. Stinchfield
   N. M. Perrins
   Attorneys Patented Jan. 7, 1930

1,742,943

UNITED STATES PATENT OFFICE

CLIFTON M. TUTTLE AND HERBERT E. WHITE, OF ROCHESTER, NEW YORK, ASSIGNORS TO EASTMAN KODAK COMPANY, OF ROCHESTER, NEW YORK, A CORPORATION OF NEW YORK

AUTOMATIC CONTROL FOR PHOTOGRAPHIC PRINTING EXPOSURES

Application filed September 26, 1927. Serial No. 221,890.

This invention relates to an automatic light control for printing motion picture film, and particularly to an improved form of the control disclosed and generically claimed in the copending application, Serial No. 179,510, filed March 30, 1927, of Loyd A. Jones and C. M. Tuttle, the latter being one of the present applicants.

As pointed out in said application, the light control is adapted for use especially with a machine for the continuous treatment of motion picture film by a reversal process and is adapted to measure the printing characteristics of a bleached image and automatically to control the printing light for an exposure prior to redevelopment. Reference is, therefore, made to said application for a complete disclosure of such apparatus.

The preferred form disclosed in said application comprised two windows, one at which the image was measured and the other at which the printing light was applied. The present improvement relates to a simplification, embodying the principles of the invention claimed in said application, in that instead of using two windows, we employ but one at which the measuring beam and the printing beam of light, while distinguishable, are in part coincident.

The sensitive emulsion, at this stage of the process mentioned is sensitive only to light rays in the blue and violet end of the spectrum, while the thermopile is so much more sensitive to red and infra-red light than to blue that the latter sensitivity may in practice be ignored. It follows, therefore, that the amount of actinic light in the beam may be varied within wide limits without appreciable effect on the thermopile. The red light may remain constant in intensity and pass through the film at the printing window without affecting it, but affecting the thermopile differentially in accordance with the density of the image on the film. The resultant reaction in the thermopile may then be used to control the amount of actinic light in the beam in the manner disclosed in said prior application.

The objects and advantages of our invention will be more apparent from the following description wherein reference is made to the accompanying drawings in the several figures of which the same reference characters denote the same parts and in which,—

Fig. 1 is a side view of the automatic printing attachment, the film guide being shown in section, Fig. 2 is a plan of the diaphragm control only, Fig. 3 shows a modified diaphragm and vane, Fig. 4 is a front view of the attachment in position on a processing machine, only fragments of the latter being shown.

The lining on the drawings does not indicate color, but is introduced to indicate distinctively the several parts, so that the structure will be clear.

The attachment 1 as a whole is placed in the path of film $f$ as it passes from one processing tank 2 to another processing tank 3 equipped for the continuous treatment of motion picture film by a reversal process, in which the printing density of the film is measured and a controlled exposure given it at a definite stage in the process. The details of the process and apparatus need not be again fully described. The film is led from tank 2 over a driving sprocket 4, driven at a constant speed, as described in said application, under a guide roller 5 in a shallow tray 6 where the film is submerged in water 9 as it passes to guide roller 7, whence it is directed to the driving sprocket 8 and into the tank 3.

The film passes over a glass window 10 in the bottom of the tank beneath which is an element 11 responsive to radiant energy. There are available on the market thermopiles having a very short time lag and responsive almost entirely to light in the red and infra red portion of the spectrum, and we prefer these for the purposes here described, though other responsive elements can be used with suitable obvious modifications of the system.

The film passes beneath a glass block 12 used for the reasons given in said other application. The tray 6 is supported on frame 13 also perforated at 14 and carrying the attachment 1.

The attachment comprises a housing 15 in the upper part of which is a lamp 16 with reflector 17. Carried on the front of the housing is a casing 18 for a part of the optical system which throws a beam of light on the film. The details of the optical system are unimportant to the present invention, but there are shown a reflecting prism 19, a lens or objective 20, condenser lenses 21, and a ground or opal glass 40.

A part of the casing 18 consists of a tube 22 telescoping into the main casing, and normally resting on the condenser mount 23. The condenser is carried in a frame 24 having edges 36 slidably carried by the housing 15. This frame and the elements carried thereby are similar to that described in said prior application. Between the condenser elements 21 is mounted a special diaphragm plate 25 having an opening 26 of special shape which may be nearly, but preferably not entirely, covered by a movable vane or shutter plate 27 on an arm 28 pivoted between points 32 and controlled by a galvanometer or similar instrument such as a standard commercial type of millivolt meter 29 connected by wires 30 in a circuit with a thermopile 11 placed beneath the window 10.

The details of this instrument which is obtainable on the market are not important to an understanding of the present invention.

Objective 20 focuses the evenly illuminated opal glass 40 in the condenser 21 and the latter focuses the evenly illuminated objective 20 upon the film. The beam is, therefore, uniform at the diaphragm and at the film.

The diaphragm and vane are together capable of transmitting a constant amount of red and infra red light, and, by movement of the vane across the opening varying the amount of photographically actinic light. This may be accomplished in various ways.

In the first way the diaphragm plate is opaque to all light waves and the shutter plate or vane is opaque to photographically actinic light but is transparent to the red and infra red rays.

In the second form, both the diaphragm plate and the shutter are opaque to photographically actinic light but transparent to red and infra red light.

In the first form there will at all times pass through the system a constant amount of red and infra red light measured by the area of the opening 26. In the second form, there will be a constant amount of red and infra red light measured by the opening of the condenser system. Both of these two forms are operative if the vane swings beyond the limit of the condenser mount as in Fig. 2.

In the third form, the diaphragm plate is transparent to red and infra red light but opaque to photographically actinic light and the shutter plate is opaque to all lights. In this form the amount of red and infra red light is measured by the total area of the beam at the diaphragm minus the area of the shutter plate, and is, therefore, constant if the entire shutter plate remains in the circular beam, as shown in Fig. 3, where the diaphragm plate is designated as 25' and the vane or shutter plate as 27'. Of course, the first two described forms can be utilized in a diaphragm and vane having the dimensional relations of Fig. 3.

It is obvious that with any of these forms, the total amount of red and infra red light transmitted through the optical system to the film is constant, and the amount reaching the radiation responsive element varies, depending on the opacity of the image in the film to such light. The position of the vane will, therefore, be controlled by this element and will by its movement, vary the effective area of the opening 26 for the passage of actinic light to which the film is sensitive. It is to be noted that this effective area increases at a much more rapid rate than the extent of movement of the vane.

We consider as within our invention all such modifications and equivalents as fall within the scope of the appended claims.

Having thus described our invention, what we claim as new and desire to secure by Letters Patent is:

1. In a machine for use in a photographic process, an element responsive to radiant energy, means for directing an image-bearing film past in front of said element, an optical system for directing a single beam of light through said film upon the element, and means controlled by the element for varying the actinic light transmitted in said single beam through the system to the film.

2. In a machine for use in a photographic process, an element predominantly responsive to photographically non-actinic light, means for directing an image-bearing film in front of said element, an optical system for directing actinic and non-actinic light through such film upon said element, said system transmitting a constant amount of non-actinic light and including means controlled by said light responsive element for varying the amount of photographically actinic light transmitted by the system.

3. In a machine for use in a photographic process, an element predominantly responsive to photographically non-actinic light, means for directing an image-bearing film in front of said element, an optical system for directing light through such film upon said element, said system including a diaphragm plate having an opening and a shutter plate movable across said opening and controlled by said light responsive element, both of said plates being opaque to photographically actinic light but together permitting a constant amount of non actinic light to pass through said system.

4. In a machine for use in a photographic process, an element predominantly responsive to photographically non-actinic light, means for directing an image-bearing film in front of said element an optical system for directing light through such film upon said element, said system including a diaphragm plate having an opening and a shutter plate movable across said opening and controlled by said light-responsive element, both of said plates being opaque to photographically actinic light and at least one of the plates transmitting non-actinic light.

5. In a machine for use in a photographic reversal process a single window, an optical system for directing a beam of light through said window, an element predominantly responsive to non-actinic light behind said window; means for propelling at a constant speed a single sensitive image-bearing film past said window and in front of said element, said optical system including elements passing a constant amount of red light to the window and elements controlled by said light-responsive element for varying the amount of photographically actinic light falling on the window.

6. In a machine for use in a photographic reversal process, a single window, an element predominantly responsive to photographically non-actinic light behind said window, means for propelling at a constant speed a single sensitive image-bearing film in front of said element and past said window, an optical system for directing light through said window upon said element, said system including a diaphragm plate having an opening and a shutter plate movable across said opening and controlled by said light-responsive element, both said plates being opaque to photographically actinic light, but together permitting a constant amount of non-actinic light to pass to said window.

7. In a machine for use in a photographic reversal process, a single window, an element predominantly responsive to photographically non-actinic light behind said window, means for propelling at a constant speed a single sensitive image-bearing film in front of said element and past said window, an optical system for directing light through said window upon said element, said system including a diaphragm plate having an opening and a shutter plate movable across said opening and controlled by said light-responsive element, both said plates being opaque to photographically actinic light and at least one of the plates transmitting non-actinic light.

8. In a machine for use in a photographic process, an element responsive to non-actinic light, means for directing an image-bearing film over said element, an optical system for directing actinic and non-actinic light through said film upon said element, said system translating a constant amount of photographically non-actinic light capable of affecting the element and including means controlled by said element for varying the amount of photographically actinic light transmitted by the system at a different rate than the variation of non-actinic light falling upon the element.

9. In a machine for use in a photographic process, an element responsive to nonactinic light, means for directing an image-bearing film over said element, an optical system for directing light through said film upon said element, a fixed diaphragm plate with an opening in said system, a shutter plate movable across said opening and controlled by said element, the opening increasing progressively from side to side, whereby the effective area thereof will increase at a more rapid rate than the extent of movement of the shutter plate, both said plates being opaque to actinic light and at least one of them transmitting non-actinic light.

10. In a machine for use in a photographic reversal process, an element predominantly responsive to non-actinic light, means for propelling at a uniform rate in front of said element a single, sensitized, image-bearing film band, an optical system for directing light through said film upon said element, a fixed diaphragm plate in said system opaque to actinic light but transmitting non-actinic light and having an opening increasing progressively in height from side to side, a shutter blade opaque to actinic light movable across said opening and controlled by said element.

Signed at Rochester, New York, this 22nd day of September, 1927.

CLIFTON M. TUTTLE.
HERBERT E. WHITE.